(12) United States Patent
Utz et al.

(10) Patent No.: US 6,709,757 B2
(45) Date of Patent: Mar. 23, 2004

(54) BARRIER FILMS

(75) Inventors: Helmar Utz, Koppigen (DE); Sabine Amberg-Schwab, Erlabrunn (DE); Gerhard Schottner, Heilsbronn (DE)

(73) Assignee: Fraunhofer-Gesellschaft zur Forderung der angewandten Forschung e.V. (DE)

( * ) Notice: Subject to any disclaimer, the term of this patent is extended or adjusted under 35 U.S.C. 154(b) by 0 days.

(21) Appl. No.: 10/254,709

(22) Filed: Sep. 25, 2002

(65) Prior Publication Data

US 2003/0077462 A1 Apr. 24, 2003

Related U.S. Application Data

(63) Continuation-in-part of application No. 08/810,617, filed on Feb. 28, 1997, now Pat. No. 6,503,634.

(30) Foreign Application Priority Data

Feb. 28, 1996 (DE) .......................... 196 07 524
Dec. 4, 1996 (DE) .......................... 196 50 236

(51) Int. Cl.$^7$ ................................. B32B 9/04
(52) U.S. Cl. .................... 428/448; 428/689; 427/419.2; 427/487
(58) Field of Search ................ 428/448, 689; 427/419.2, 487

(56) References Cited

U.S. PATENT DOCUMENTS

| | | | | |
|---|---|---|---|---|
| 5,645,923 A | * | 7/1997 | Matsuo et al. | 428/216 |
| 6,246,505 B1 | * | 6/2001 | Teowee et al. | 359/241 |
| 6,423,128 B1 | * | 7/2002 | Amberg-Schwab et al. | 106/287.13 |
| 6,472,467 B1 | * | 10/2002 | Chiao | 524/755 |
| 6,503,634 B1 | * | 1/2003 | Utz et al. | 428/448 |

* cited by examiner

Primary Examiner—D. Lawrence Tarazano
(74) Attorney, Agent, or Firm—Marshall & Melhorn, LLC

(57) ABSTRACT

The invention concerns composites with excellent barrier properties to gases and water vapor. Such composites can be used, e.g., in foodstuff packaging or as technical membranes. The outstanding barrier effect is achieved by arranging on a substrate material, which, for example, may consist of biodegradable polymers, at least two films. At least one of these films consists of an organic-inorganic hybrid polymer (ORMOCER), at least one further film of a further barrier material or of a substrate material.

24 Claims, 2 Drawing Sheets

BARRIER FILMS

This application is a continuation-in-part of, and claims priority from U. S. patent application Ser. No. 08/810,617, filed on Feb. 28, 1997 now U.S. Pat. No. 6,503,634. U.S. patent application Ser. No. 08/810,617 was pending as of the filing date of this application. U.S. patent application Ser. No. 08/810,617 is hereby incorporated by reference as it set forth in its entirety herein.

BACKGROUND OF THE INVENTION

1. Field of the Invention

This invention concerns composites of substrate material and, applied on it, a barrier film with a barrier effect to gases and water vapor. The invention also concerns a method for producing these composites. Such composites can be used in packaging, for example, in the form of foils, panels or shapes and hollow parts, and also for technical applications, for example, as membranes or protective films for sensors.

2. Summary of Related Art

Presently, metals, e.g., aluminum or tinplate, glass, polymers, e.g., EVOH or PVDC, and polymers provided with vaporized thin metallic or oxidic films or combinations thereof are generally employed as barrier materials. As against glass and metals, polymers are characterized by their low weight and the small amounts of material needed, for which reason they are frequently used especially in the packaging field. On the other hand, due to their structure and associated permeability to gases and water vapor, polymers are unsuited for applications involving especially high requirements as to barrier properties. Gaining increasingly in significance, especially due to ecological concerns, are the renewable or recycleable polymers. However, they display a comparatively high permeability to gas and present extremely insufficient barrier properties to water vapor. Therefore, they are barred from many applications.

Owing to the mostly insufficient barrier effect to gases and water vapor, polymers are often used in combination with other materials. For example, the barrier properties of polymers allow considerable improvement by application of thin films of aluminum, aluminum oxide or silicon oxide, but the permeation rates continue to be excessively high for many applications and can be detected using conventional measuring techniques (oxygen permeability >0.5 $dm^3/(m^2$ d bar)). Moreover, renewable polymers show also after coating, as compared to coated standard polymers such as polyethylene or poly-propylene, permeation rates that are higher by far. Vaporized films being very sensitive to mechanical stresses, it is mostly necessary to laminate the coated substrates, for example with a foil.

For some time it has been known (e.g., DE-OS 38 28 098 Al) to produce scratchproof coating materials by hydrolytic polycondensation of an organofunctional silane, for example with an aluminum compound, and, as the case may be, with inorganic oxide components. Hybrid polymers (so called ORMOCERs) synthesized in this fashion possess both inorganic and organic network structures. The inorganic siliceous network structure is obtained by the sol-gel process (e.g., C. J. Brinker, D. W. Scherer, Sol-Gel-Science; The Physics and Chemistry of Sol-Gel Processing, Academic Press, Inc., New York, 1989) via controlled hydrolysis and condensation of alkoxy silanes. The siliceous network allows specific modification by including additionally metal alkoxides in the sol-gel process. Additionally, an organic network is produced by polymerization of organofunctional groups that are introduced in the material by the organoalkoxy silanes. Reactive methacrylate, epoxy or vinyl groups are polymerized by thermal or photochemical induction. The ORMOCERs produced in this way can be applied on the medium to be coated by means of conventional application techniques (spraying, brushing, etc.). Despite suitable wetting behavior and sound film adhesion, even a composite of an ORMOCER film and a polymer foil is unable to reduce the high permeability of many polymers, and notably renewable polymers, to a degree that would be required, e.g., in foodstuff packaging.

OBJECT AND SUMMARY OF THE INVENTION

Therefore, the objective underlying the present invention is to coat substrate materials to the effect that they become extensively impermeable to gases and water vapor.

This objective is satisfied according to the invention by composites with the characterizing features set forth in claim 1 and, in process-related respects, in claim 21. Favorable embodiments and improvements of inventional composites derive from the subclaims.

A composite based on a substrate material on which in accordance with claim 1 at least two-films are arranged of which at least one barrier film contains inorganic-organic hybrid polymers (ORMOCER film) while at least one further film of substrate material or other barrier material has in comparison with the original substrate material or with single-coated substrate material a far lower permeability.

Inventional composites have a high barrier effect to gases and water vapor. Surprisingly, even the permeation rates of native polymers notably allow reduction to an extent such that these prove to be extensively impermeable to gases and water vapor, thus opening new areas of application to native polymers.

When applying an ORMOCER film 1 $\mu$m to 15 $\mu$m thick on a substrate material coated with a barrier film containing a metal and/or metal oxide and/or semiconductor, also the mechanical stability of the films applied first can be drastically improved, in addition to the barrier effect of the composite. Thus, the ORMOCER film assumes at the same time the function of a mechanical protective film that may make further process steps, such as lacquering or laminating, superfluous. For this reason it will mostly prove suitable to apply the ORMOCER film as the concluding film on the substrate material that has already been coated otherwise.

Of course, it is also possible to apply an ORMOCER film directly on the substrate material. Thereafter, further barrier films (for example a silicon oxide film) and/or a further substrate material film may be applied. For example, the silicon oxide sides of two coated substrate materials or the silicon oxide side of a coated and an uncoated substrate material can be combined on a conventional laminating system with ORMOCER as laminating adhesive.

Surprisingly, however, already a composite of two substrate materials, for example polymer foils with an ORMOCER barrier film arranged in between, also possess outstanding barrier properties. The ORMOCER film may also in this case serve as a laminating adhesive.

While the barrier properties of polymers are by application of a barrier film of silicon oxide of 100 nm thickness improved by a factor of 100, on average, the barrier properties of this composite increase after the additional application and curing of an ORMOCER film, surprisingly, once again by a factor of 100. This fact shows which significance attaches exactly to a double-film application.

Instead of the silicon oxide film, also metal films may be used, for example films of aluminum or other prior-art coating metals and/or semiconductor films such as silicon film and/or metal oxide films such as aluminum oxides, magnesium oxides, cerium oxides, hafnium oxides, tantalum oxides, titanium oxides such as titanium dioxide, titanium (3) oxide or titanium monoxide, yttrium oxides or zirconium oxides such as zirconium monoxide, as well as barrier-films containing mixtures of these substances. The metal and/or metal oxide and/or semiconductor films typically have a thickness of 5 nm to 1000 nm, preferably between 20 and 150 nm.

All of the polymers (e.g., polyamide, polyethylene, polyproylene or polyester) lend themselves as substrate materials for coatings according to the invention. Especially applicable as substrate materials are biologically decomposable polymers and particularly native polymers (cellophane, proteinaceous or starchy polymers) with an inherently low barrier effect. Also paper, cardboard, coated paper or coated cardboard are suited as substrate materials. Particularly pronounced improvements in view of gas and water vapor permeability are achievable with the inventional coating in the case of thin substrate mainly (for example foils) having thicknesses in the range of about 5 $\mu$m to 2 mm. In addition to foils, however, also panels, shapes, hollow articles, membranes or protective films for sensors are suited as substrate materials.

Sealability of the composites can be guaranteed with the use of sealable substrate films or by application of sealable films on the composites. An example would be a copolymer film coextruded on polypropylene. Sealability is of great significance especially in foodstuff packaging. Also the use of oriented polymers, for example axially or biaxially oriented polypropylene, has proved to be favorable.

Inventionally coated plastics, notably native polymers, open for themselves a great many new areas of application which so far were unavailable to plastics (for example foodstuff preserves). Metal or glass could in many areas be substituted by plastics coated in this fashion, which means drastic weight savings. Furthermore, plastics coated in this fashion allow the manufacture of barrier materials which, unlike metals, are transparent. Possible also is the realization of a sealable, nearly varietally pure barrier composite (refer to exemplary embodiment 5).

The barrier properties of the ORMOCER allow specific adjustment by kind and share of the organic and inorganic network as well as via the network converters. Both the wetting behavior and film adhesion as well as the barrier properties can be optimized in this way. The thickness of the applied ORMOCER film ranges typically from 1 $\mu$m to 15 $\mu$m. The invention covers all of the ORMOCERS in the prior art. German patent publications DE-OS 38 28 098 as well as DE 43 03 570 are hereby incorporated by reference as if set forth in their entirety herein.

The further, inventional addition of functionalized $SiO_2$ particles, which in the ORMOCER synthesis are worked in and covalently bound to the organic network, leads to a higher density of the inorganic network. Instead of $SiO_2$ particles, also other particles may be used, for example functionalized $Al_2O_3$ particles. The barrier properties of the composite allow in this way still further improvement.

Inventional composites with barrier properties can be produced by applying at least two films on a substrate material, with at least one of these films being a barrier film containing ORMOCERs, which film is applied by brushing, spraying, rolling, centrifugal or doctor processes and subsequently cured by heat and/or photochemical induction and/or thermal induction, and with at least one further film of another barrier material or substrate material being applied before or after application of the at least one ORMOCER film.

BRIEF DESCRIPTION OF THE DRAWINGS

Further details, characteristics and advantages of the present invention derive from the following exemplary embodiments and with the aid of the drawing figures, showing in.

DETAILED DESCRIPTION OF THE PREFERRED EMBODIMENT

The following describes the exemplary composition of two suitable ORMOCER lacquers.

Coating material 1

40 mol % TMOS      12.5 mol % Al $(OBu^S)_3$
32.5 mol % GLYMO      10 mol % Zr $(OPr)_4$
5 mol % AMEO
    This lacquer system is cured thermally at 130° C.

Coating material 2

70 mol % MEMO      15 mol % methacrylic acid
15 mol % Zr $(OPr)_4$
    This lacquer system is cured by photochemical or thermal induction.

Figure 1:
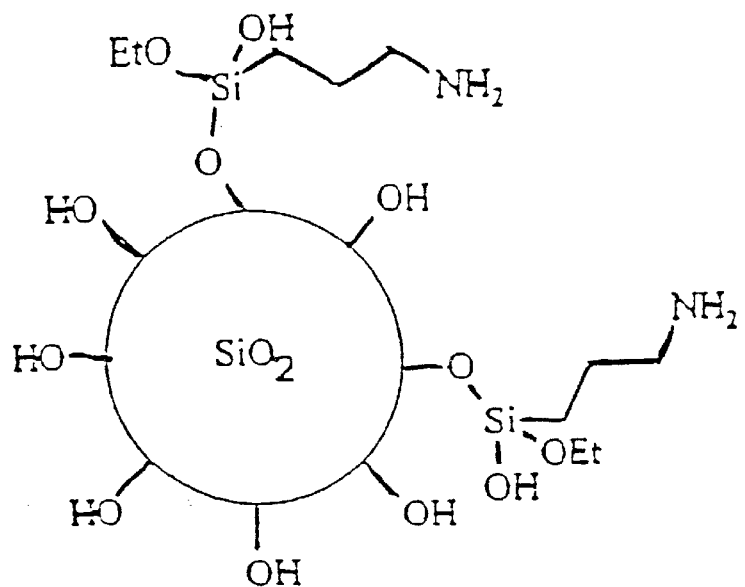
FIG. 1, a simplified illustration of an amino-functionalized $SiO_2$ particle.

Abbreviations:
TMO Stetramethoxy silane
GLYMO 3-glycidoxypropyltrimethoxy silane
AMEO 3-aminopropyltriethoxy silane
MEMO 3-methacryloxypropyltrimethoxy silane
Al$(OBu^3)_3$ aluminum trisecondary butylate
Zr$(OPr)_4$ zirconium tetrapropylate
BOPP biaxially oriented polypropylene
PETP polyethylene terephthalate To improve the barrier properties, approximately 1 mass-% of amino-functionalized (FIG. 1) or methacrylate-functionalized $SiO_2$ particles by the firm Degussa (Aerosil 200) may be incorporated additionally in both systems during the lacquer synthesis.

Several exemplary embodiments of inventional composites with barrier properties are described hereafter. The silicon oxide films are applied, e.g., by vaporization of silicon monoxide or by means of plasma CVD (chemical vapor deposition). ORMOCERs may be applied by conventional lacquering processes such as spraying, brushing, rolling or centrifuging; in the exemplary embodiments, coating may be carried out using a raster roll. The applied ORMOCER lacquers are cured preferably in-line, for example by heat or photochemical induction.

An example of ORMOCERs used in the present invention, can be prepared by a hydrolytic condensation of a predetermined amount of a first monomeric starting material having at least one crosslinkable, organofunctional silane of the formula $R'''_m SiX_{(4-m)}$ wherein X is selected from the group consisting of hydrogen, halogen, alkoxy, acyloxy, alkycarbonyl, alkoxycarbonyl and —NR"$_2$, where R" is selected from the group consisting of H and alky, and the radical R''' is selected from the group consisting of alkyl, alkenyl, alkinyl, aryl, arylalkyl, alkylaryl, arylalkenyl, alkenylaryl, arylalkinyl or alkinylaryl, in which the radicals can include 0 or S-atoms or the group —NR" and can carry one or more substituents from the group of halogens and optionally substituted amino, amide, aldehyde, keto, alkycarbonyl, carboxy, mercapto, cyano, hydroxy, alkoxy, alkoxycarbonyl, sulphonic acid, phosphoric acid, acryloxy, methacryloxy, epoxy or vinyl groups and, m has the value 1, 2, or 3, in which the radical R''' and/or the constituent must be a crosslinkable radical, and a predetermined amount of a second monomeric starting material having at least one metal compound of general formula $MeR_y$, in which Me is a metal selected from the group consisting of Al, Zr, or Ti, and the radical R, which can be the same or different, is selected from the group consisting of halogen, alkyl, alkoxy, acyloxy or hydroxy, in which said groups can be wholly or partly replaced by chelating ligands and/or an f oligomer derived therefrom and/or an optionally complexed metal salt of an inorganic or organic acid, and wherein the value of y is 3 when Me is Al and y is 4 when Me is Zr or Ti, the predetermined amount of the first material and the predetermined amount of the second material being selected to optimize the barrier properties of the resultant barrier film, and?

Exemplary Embodiment 1

Figure 2:
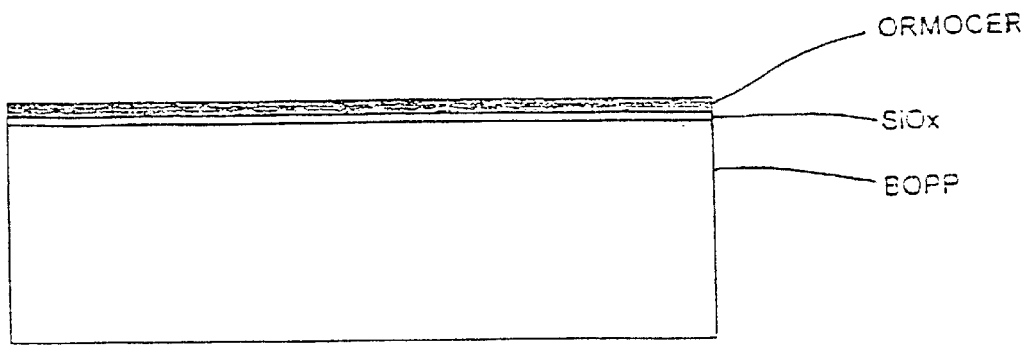
FIG. 2, an exemplary embodiment of a polymer foil with a vaporized $SiO_x$ film and an ORMOCER protective film.

To begin with, an $SiO_x$ film about 100 nm thick is vaporized on a sealable BOPP foil of about 20 $\mu$m thickness. Next, the $SiO_x$ film is coated over with about 3 g/m$^2$ ORMOCER and cured (FIG. 2). The starting foil has at 23° C. and about 75% relative humidity an oxygen permeability of about 30 cm$^3$/(m$^2$ d bar). The oxygen permeability of the foil coated additionally with ORMOCER is <1 cm$^3$/(m$^2$ d bar). The foil can be used as a sealable high-barrier packaging foil.

Exemplary Embodiment 2

To begin with, an $SiO_x$ film about 100 nm thick is vaporized on a PETP foil of about 12 $\mu$m thickness. Next, the $SiO_x$ film is coated over with about 3 g/m$^2$ ORMOCER and cured. The starting foil has at 23° C. and about 75% relative humidity an oxygen permeability of about 2 cm$^3$/(m$^2$ d bar). The oxygen permeability of the foil coated additionally with ORMOCER is no longer detectable with commercially available permeability measuring apparatuses, that is, it amounts to <0.05 cm$^3$ (m$^2$ d bar). Upon application of a sealing lacquer or after laminating, e.g., to a polyethylene foil, the foil could be used as high-barrier packaging foil.

Exemplary Embodiment 3

To begin with, an $SiO_x$ film about 100 nm thick is vaporized on a cellophane foil of about 20 $\mu$m thickness. Next, the $SiO_x$ film is coated over with about 3 g/m$^2$ ORMOCER and cured (FIG. 2). The starting foil has at 23° C. and 0 to 85% relative humidity gradient a water vapor permeability of about 20 g/(m$^2$ d). The water vapor permeability of the foil coated additionally with ORMOCER amounts to approximately 0.5 g/(m$^2$ d). Hence, the water vapor permeability is so low that, unlike all other foils of renewable raw materials, the foil can be used also for packaging very moisture-sensitive goods.

Exemplary Embodiment 4

Figure 3:
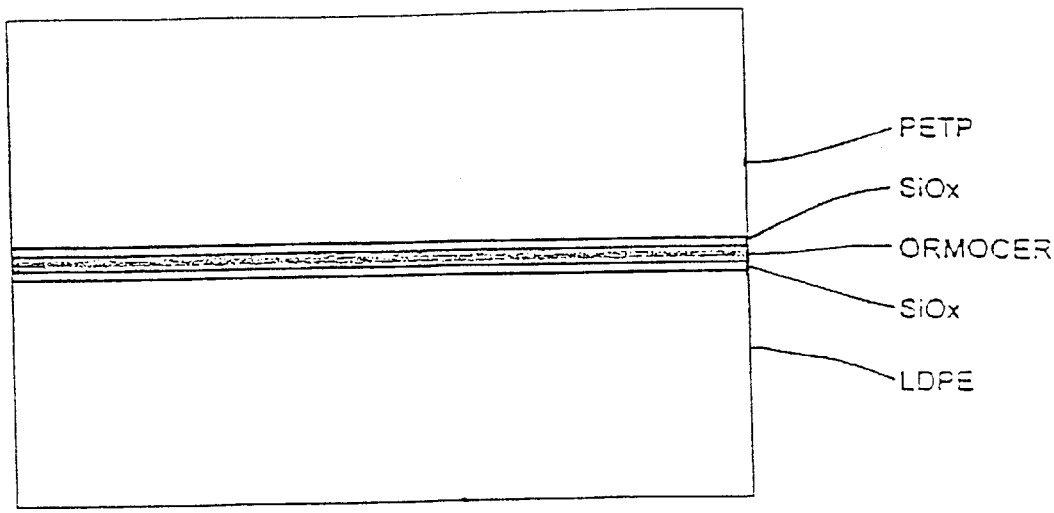
FIG. 3, an exemplary embodiment of a sealable composite consisting of two polymer foils with vaporized $SiO_x$ films and an ORMOCER film as laminating adhesive.

The coated sides of two foils (a PEPT foil 12 $\mu$m thick and an LDPE foil 60 $\mu$m thick) vaporized with $SiO_x$ are glued on a conventional laminating system (FIG. 3) with ORMOCER serving as laminating adhesive. The resulting composite has an oxygen permeability of <0.05 cm$^3$ (m$^2$ d bar), is sealable and can be used, e.g., for foodstuff packaging.

Figure 4:
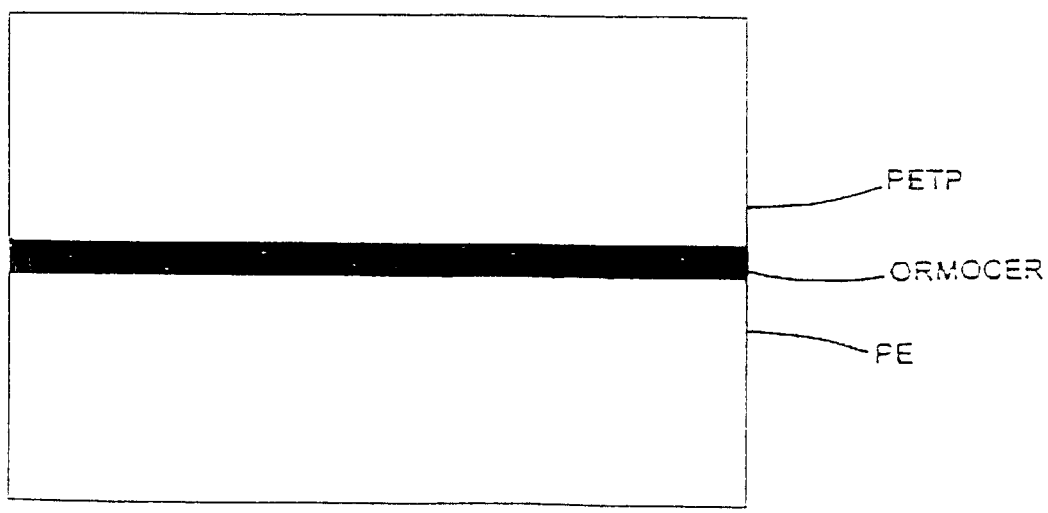
FIG. 4, an exemplary embodiment of a foil composite of two polymer foils between which an ORMOCER film is disposed as laminating adhesive.

To realize a barrier composite with good barrier properties it is sufficient to glue (FIG. 4) uncoated polymer foil, for example of PP, PE or PET, using ORMOCERs as laminating adhesive. To that end, for example a PE foil 15 $\mu$m thick is on a conventional laminating system glued to a PETP foil of 15 $\mu$m thickness by means of ORMOCER.

Exemplary Embodiment 5

The coated sides of two BOPP foils (one foil of PP-homopolymer and the other a sealable triple-film foil) vaporized with $SiO_x$ each 20 $\mu$m thick are glued on a conventional laminating system using ORMOCER as laminating adhesive. The resulting composite is sealable and nearly varietally clean, that is, apart from the thin barrier films it contains only polypropylene as polymer.

Of course, inventional composites are not limited to foils. Also panels, shapes and hollow articles, membranes, protective films for sensors or other mediums, which should have a good barrier effect to gases and water vapor, lend themselves as substrate mediums for a coating according to the invention.

In addition to polymers, inventional barrier films may be applied also on cardboard, paper, coated cardboard or coated paper. For example, an ORMOCER primer may be applied first on cardboard or paper, followed by a metal or metal oxide film. Suitable as mechanical protective film on top of these would be again a concluding ORMOCER film. Paper laminated with an ORMOCER film on the vaporized side of a substrate foil may be used as well.

At least one embodiment of the present invention teaches a method for the manufacture of composites with barrier properties, comprising providing a substrate material, applying on the substrate material a barrier film containing ORMOCERs, the barrier film being applied by a method selected from the group consisting of brushing, spraying, rolling, centrifugal and doctor processes, and subsequently curing the barrier film by a process selected from the group consisting of heat, photochemical induction, thermal induction and mixtures thereof, the ORMOCERS being prepared by a hydrolytic condensation of a predetermined amount of a first monomeric starting material having at least one crosslinkable, organofunctional silane of the formula $R'''_m SiX_{(4-m)}$ wherein X is selected from the group consisting of hydrogen, halogen, alkoxy, acyloxy, alkycarbonyl, alkoxycarbonyl and —NR"$_2$, where R" is selected from the group consisting of H and alky, and the radical R''' is selected from the group consisting of alkyl, alkenyl, alkinyl, aryl, arylalkyl, alkylaryl, arylalkenyl, alkenylaryl, arylalkinyl or alkinylaryl, in which the radicals can include 0 or S-atoms or the group —NR" and can carry one or more substituents from the group of halogens and optionally substituted amino, amide, aldehyde, keto, alkycarbonyl, carboxy, mercapto, cyano, hydroxy, alkoxy, alkoxycarbonyl, sulphonic acid, phosphoric acid, acryloxy, methacryloxy, epoxy or vinyl groups and, m has the value 1, 2, or 3, in which the radical R''' and/or the constituent must be a crosslinkable radical, and a predetermined amount of a second monomeric starting material having at least one metal compound of general formula $MeR_y$, in which Me is a metal selected from the group consisting of Al, Zr, or Ti, and the radical R, which can be the same or different, is selected from the group consisting of halogen, alkyl, alkoxy, acyloxy or hydroxy, in which said groups can be wholly or partly replaced by chelating ligands and/or an oligomer derived therefrom and/or an optionally complexed metal salt of an inorganic or organic acid, and wherein the value of y is 3 when Me is Al and y is 4 when Me is Zr or Ti, the predetermined amount of the first material and the predetermined amount of the second material being selected to optimize the barrier properties of the resultant barrier film, and applying at least one further film in which the further film is selected from the group consisting of another barrier material and an additional substrate material.

What is claimed is:

1. A method for the manufacture of composites with barrier properties, comprising:

providing a substrate material, applying on the substrate material a barrier film containing ORMOCERs, the barrier film being applied by a method selected from the group consisting of brushing, spraying, rolling, centrifugal and doctor processes, and subsequently curing the barrier film by a process selected from the group consisting of heat, photochemical induction, thermal induction and mixtures thereof, the ORMOCERS being prepared by a hydrolytic condensation of a predetermined amount of a first monomeric starting material having at least one crosslinkable, organofunctional silane of the formula $R'''{}_m SiX_{(4-m)}$, wherein X is selected from the group consisting of hydrogen, halogen, alkoxy, acyloxy, alkycarbonyl, alkoxycarbonyl and —NW''$_2$, where R'' is selected from the group consisting of H and alky, and the radical R''' is selected from the group consisting of alkyl, alkenyl, alkinyl, aryl, arylalkyl, alkylaryl, arylalkenyl, alkenylaryl, arylalkinyl or alkinylaryl, in which the radicals can include O or S-atoms or the group —NR'' and can carry one or more substituents from the group of halogens and optionally substituted amino, amide, aldehyde, keto, alkycarbonyl, carboxy, mercapto, cyano, hydroxy, alkoxy, alkoxycarbonyl, sulphonic acid, phosphoric acid, acryloxy, methacryloxy, epoxy or vinyl groups and, m has the value 1, 2, or 3, in which the radical R''' and/or the constituent must be a crosslinkable radical, and a predetermined amount of a second monomeric starting material having at least one metal compound of general formula MeR$_y$, in which Me is a metal selected from the group consisting of Al, Zr, or Ti, and the radical R, which can be the same or different, is selected from the group consisting of halogen, alkyl, alkoxy, acyloxy or hydroxy, in which said groups can be wholly or partly replaced by chelating ligands and/or an oligomer derived therefrom and/or an optionally complexed metal salt of an inorganic or organic acid, and wherein the value of y is 3 when Me is Al and y is 4 when Me is Zr or Ti, the predetermined amount of the first material and the predetermined amount of the second material being selected to optimize the barrier properties of the resultant barrier film, and applying at least one further film in which the further film is selected from the group consisting of another barrier material and an additional substrate material.

2. A method according to claim 1, wherein:

said second film comprises a second barrier film containing ORMOCERS; and said composite comprises a second substrate material, said first and second barrier films are arranged between said first and second substrate materials.

3. A method according to claim 1, wherein:

said second film is a second substrate; and said first barrier film is a laminating film between said first and second substrate materials.

4. A method according to claim 2, wherein the first and second substrate materials are selected from the group consisting of paper, cardboard, coated paper, and coated cardboard.

5. A method according to claim 1 wherein said second film has a thickness between 5 nm and 1000 nm.

6. A method according to claim 1 wherein said barrier film has a thickness between 1 $\mu$m and 15 $\mu$m.

7. A method according to claim 1 wherein said barrier film comprises a plurality of functionalized particles, the plurality of functionalized particles being selected from the group consisting of $SiO_2$ and $Al_2O_3$.

8. A method according to claim 1 wherein the substrate material is selected from the group consisting of paper, cardboard, coated paper, and coated cardboard.

9. A method according to claim 1, wherein the substrate material consists of a polymer material.

10. A method according to claim 1, wherein the substrate material is selected from the group consisting of polyamide, polyethylene, polypropylene, and polyester.

11. A method according to claim 1, wherein the substrate material comprises at least one biologically degradable polymer.

12. A method according to claim 1, wherein the substrate material comprises at least one naturally occurring polymer.

13. A method according to claim 1, wherein the substrate material is selected from the group consisting of cellophane, a starchy material, and a proteinaceous material.

14. A method according to claim 1, wherein the substrate material is in the form of, and is selected from the group consisting of foils, panels, hollow articles, membranes and protective films for sensors.

15. A method according to claim 1, wherein the substrate material is a foil with a thickness between 5 $\mu$m and 2 $\mu$m.

16. A method according to claim 1, wherein the substrate material consists of an oriented polymer.

17. A method according to claim 1 wherein the substrate material is sealable and/or provided with a sealable film.

18. A composite forming a barrier against gases and liquids made according to the method of claim 1.

19. A composite formed according to the method of claim 1, wherein the composite has an oxygen permeability of less than 1 cm$^3$/(m$^2$ d bar) at 23° C. and about 75% relative humidity.

20. A composite formed according to the method of claim 1, wherein the composite has an oxygen permeability of less than 0.05 cm$^3$/(m$^2$ d bar) at 23° C. and about 75% relative humidity.

21. A composite formed according to the method of claim 1, wherein the composite has a water vapor permeability of less than 0.5 g/(m$^2$ d) at 23° C. and between 0 and 85% relative humidity.

22. A composite formed according to the method of claim 1, wherein the composite has an oxygen permeability of less than 1/30 of the oxygen permeability of the uncoated substrate at 23° C. and about 75% relative humidity.

23. A composite formed according to the method of claim 1, wherein the composite has an oxygen permeability of less than 1/40 of the oxygen permeability of the uncoated substrate at 23° C. and about 75% relative humidity.

24. A composite formed according to the method of claim 1, wherein the composite has a water vapor permeability of less than 1/40 of the water vapor permeability of the uncoated substrate at 23° C. and between 0 and 85% relative humidity.

* * * * *